United States Patent
Petrick

(10) Patent No.: US 10,396,642 B2
(45) Date of Patent: *Aug. 27, 2019

(54) MAGNETIC PROPULSION AND ELECTRICAL GENERATION SYSTEM

(71) Applicant: Allen Petrick, Prescott Valley, AZ (US)

(72) Inventor: Allen Petrick, Prescott Valley, AZ (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/444,851

(22) Filed: Feb. 28, 2017

(65) Prior Publication Data

US 2018/0248424 A1    Aug. 30, 2018

(51) Int. Cl.
| | | |
|---|---|---|
| *H02K 16/00* | (2006.01) | |
| *H02K 21/00* | (2006.01) | |
| *H02K 7/116* | (2006.01) | |
| *H02K 13/00* | (2006.01) | |

(52) U.S. Cl.
CPC .......... *H02K 16/005* (2013.01); *H02K 21/00* (2013.01); *H02K 7/116* (2013.01); *H02K 13/003* (2013.01)

(58) Field of Classification Search
CPC ........ B64G 1/40; H02K 16/005; H02K 21/00; H02K 13/003; H02K 7/116; H02K 49/102; H02K 7/1166; H02K 7/1163; H02K 16/00; H02K 16/02; H02K 47/04; H02K 47/14; H02K 47/20; H02K 51/00; H20K 49/106
USPC ........................ 310/112, 113, 114, 46, 83, 99
See application file for complete search history.

(56) References Cited

U.S. PATENT DOCUMENTS

| | | | | |
|---|---|---|---|---|
| 2,782,328 A | * | 2/1957 | Lindberg ............... | H02K 16/00 310/112 |
| 3,168,665 A | * | 2/1965 | Holper ..................... | F16H 1/22 310/112 |
| 3,723,796 A | * | 3/1973 | Mason .................... | H02K 16/00 310/126 |
| 4,169,983 A | * | 10/1979 | Felder .................... | H02K 25/00 310/103 |
| 4,691,119 A | * | 9/1987 | McCabria .............. | H02K 7/116 290/4 C |
| 4,751,486 A | * | 6/1988 | Minato ................... | H02K 53/00 310/103 |

(Continued)

*Primary Examiner* — Julio C. Gonzalez
*Assistant Examiner* — Ahmed Elnakib
(74) *Attorney, Agent, or Firm* — Plager Schack LLP; Mark H. Plager; Alexis J. Saenz

(57) ABSTRACT

A magnetic propulsion drive system provides power output by including the use of permanent magnets repelled by electromagnets on adjacent rotor assemblies. In some embodiments, the electromagnets may be inactive until synchronized to face an opposing permanent magnet of the same polarity. The electromagnet may be energized thus causing a repellant force with the permanent magnet causing radial momentum in the rotor assembly to rotate a larger drive module of rotor assemblies. Embodiments may include two or more drive modules arranged to position opposing magnets of the same type so that each drive modules is driven producing and output torque through a drive shaft. Some embodiments include a stator element which may be a cage surrounding the rotor assemblies. Interaction of the magnets with the stator simultaneously provides electric field generation and current while producing mechanical drive output.

14 Claims, 25 Drawing Sheets

(56) References Cited

U.S. PATENT DOCUMENTS

| | | | | |
|---|---|---|---|---|
| 4,752,706 | A * | 6/1988 | Meszaros | H02K 16/02 310/80 |
| 5,534,737 | A * | 7/1996 | Nishimura | H02K 16/00 310/112 |
| 5,684,351 | A * | 11/1997 | Elferich | H02K 16/02 310/112 |
| 5,814,913 | A * | 9/1998 | Ojima | F04C 28/08 310/112 |
| 6,447,271 | B2 * | 9/2002 | Ojima | F04C 28/08 417/410.1 |
| 7,705,501 | B2 * | 4/2010 | Yang | 310/112 |
| 7,802,494 | B2 * | 9/2010 | Batistic | F16H 37/065 74/665 B |
| 9,455,615 | B1 * | 9/2016 | Petrick | H02K 16/005 |
| 2002/0135242 | A1 * | 9/2002 | Kawai | H02K 21/20 310/49.32 |
| 2005/0140230 | A1 * | 6/2005 | Johnson | B60K 6/26 310/112 |
| 2006/0226725 | A1 | 10/2006 | Wise | |
| 2007/0142161 | A1 | 6/2007 | Miller | |
| 2007/0284956 | A1 * | 12/2007 | Petrovich | H02K 7/06 310/80 |
| 2008/0309174 | A1 | 12/2008 | Jockel | |
| 2010/0156221 | A1 * | 6/2010 | Dooley | H02K 7/116 310/114 |
| 2016/0156254 | A1 * | 6/2016 | Bowen | H02K 9/102 310/68 B |
| 2016/0368363 | A1 * | 12/2016 | Petersen | B60L 3/0061 |
| 2018/0248424 | A1 * | 8/2018 | Petrick | B64G 1/40 |

* cited by examiner

MAGNETIC PROPULSION AND ELECTRICAL GENERATION SYSTEM

BACKGROUND

The embodiments herein relate generally to magnetic propulsion systems.

Current electric motors, and DC motors in particular, suffer from one or more drawbacks. Many types of motor are inefficient. More efficient models are available, but these motors have electronic control systems that are complex, expensive, or both.

SUMMARY

According to one embodiment of the subject technology, a magnetic propulsion drive system comprises a first radial magnetic assembly (RMA); a first axle coupled to the first RMA; a first permanent magnet of a first polarity on an exterior surface of the first RMA; a second RMA; a second axle coupled to the second RMA; a first electromagnet magnet of the first polarity on an exterior surface of the second RMA, the first permanent magnet disposed to align with the first electromagnet during rotation of the first RMA and rotation of the second RMA, wherein the first electromagnet is activated when in alignment with the first permanent magnet, the first electromagnet and the first permanent magnet repelling from each other during activation of the first electromagnet and causing the first axle and second axle to rotate; a drive shaft rotated by turning of the first axle and the second axle; a stator element proximate the first permanent magnet and the second permanent magnet; and an electrical output conductor coupled to the stator element configured to receive current generated by interaction of the first permanent magnet and the second permanent magnet with the stator element during rotation of the first RMA and rotation of the second RMA.

According to another embodiment of the subject technology, a magnetic propulsion drive module comprises a first, a second, a third, and a fourth drive module arranged longitudinally parallel to each other, each drive module comprising at least one rotor block assembly including a plurality of electromagnets positioned to and configured to repel from a plurality of permanent magnets on any adjacent one of the first, second, third, or fourth drive modules, the repulsion of the electromagnets from the permanent magnets causing radial momentum and rotation of the first, second, third, or fourth drive modules; a gear coupled to the first, second, third, and fourth drive modules; a drive shaft coupled to the output shaft gear and rotated by turning of the planetary gears coupled to either the first and third or second and fourth drive modules; a stator element proximate the plurality of permanent magnets of the first polarity and the plurality of permanent magnets of the second polarity; and an electrical output conductor coupled to the stator element configured to receive current generated by interaction of the plurality of permanent magnets of the first polarity and the plurality of permanent magnets of the second polarity with the stator element during rotation of the first, second, third, and fourth drive modules.

BRIEF DESCRIPTION OF THE FIGURES

The detailed description of some embodiments of the present invention is made below with reference to the accompanying figures, wherein like numerals represent corresponding parts of the figures.

DETAILED DESCRIPTION OF CERTAIN EMBODIMENTS

Broadly, embodiments of the subject technology provide a magnetic propulsion drive system. The magnetic propulsion drive system may be expandable to meet various power output needs. The word "exemplary" is used herein to mean "serving as an example or illustration." Any aspect or design described herein as "exemplary" is not necessarily to be construed as preferred or advantageous over other aspects or designs.

Figure 1:
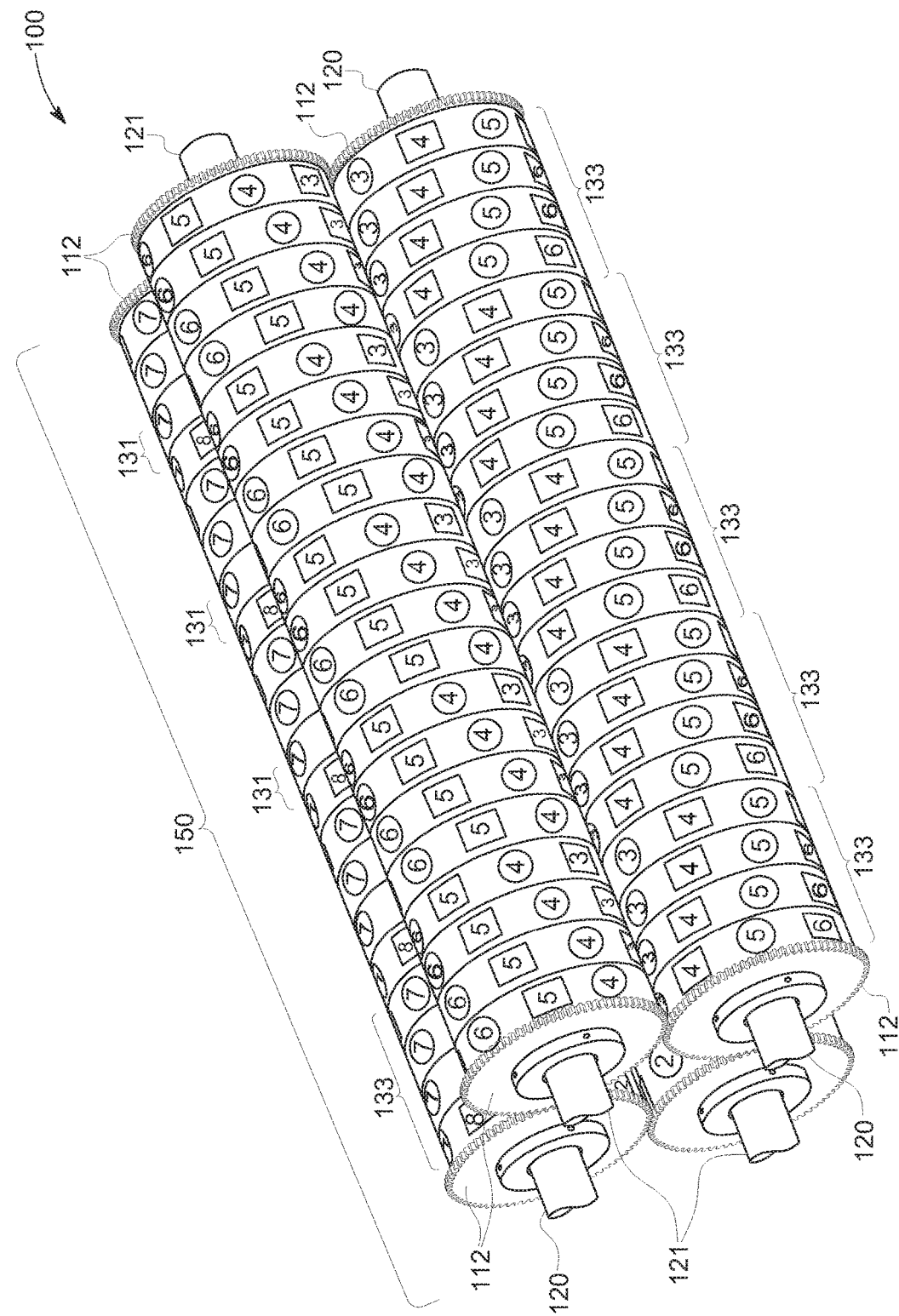
FIG. 1 is a perspective view of a magnetic drive propulsion system according to an exemplary embodiment of the subject technology.
Figure 2:
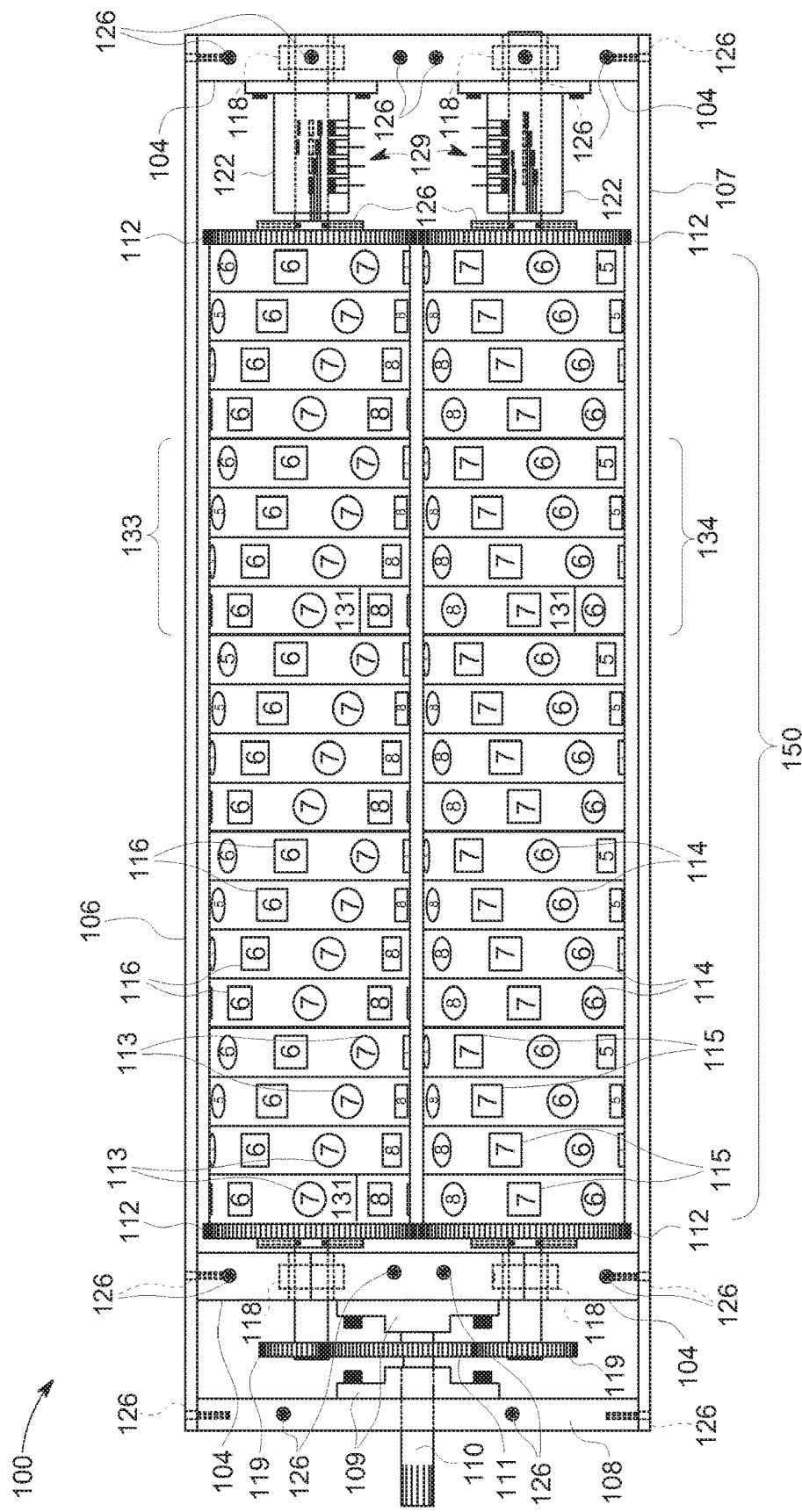
FIG. 2 is a top view of the magnetic drive propulsion system of FIG. 1.
Figure 3:
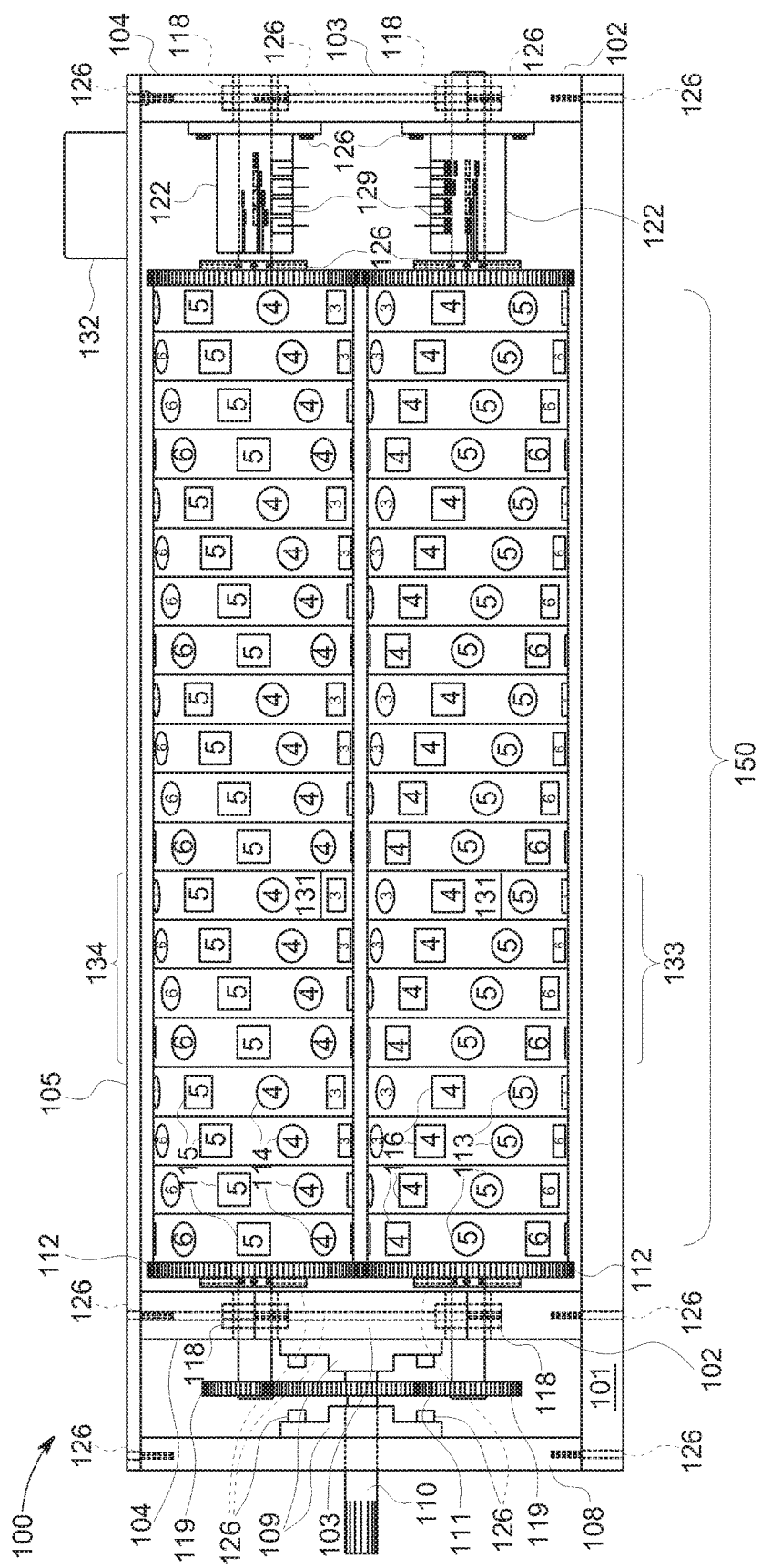
FIG. 3 is a right side view of the magnetic drive propulsion system of FIG. 1.
Figure 4:
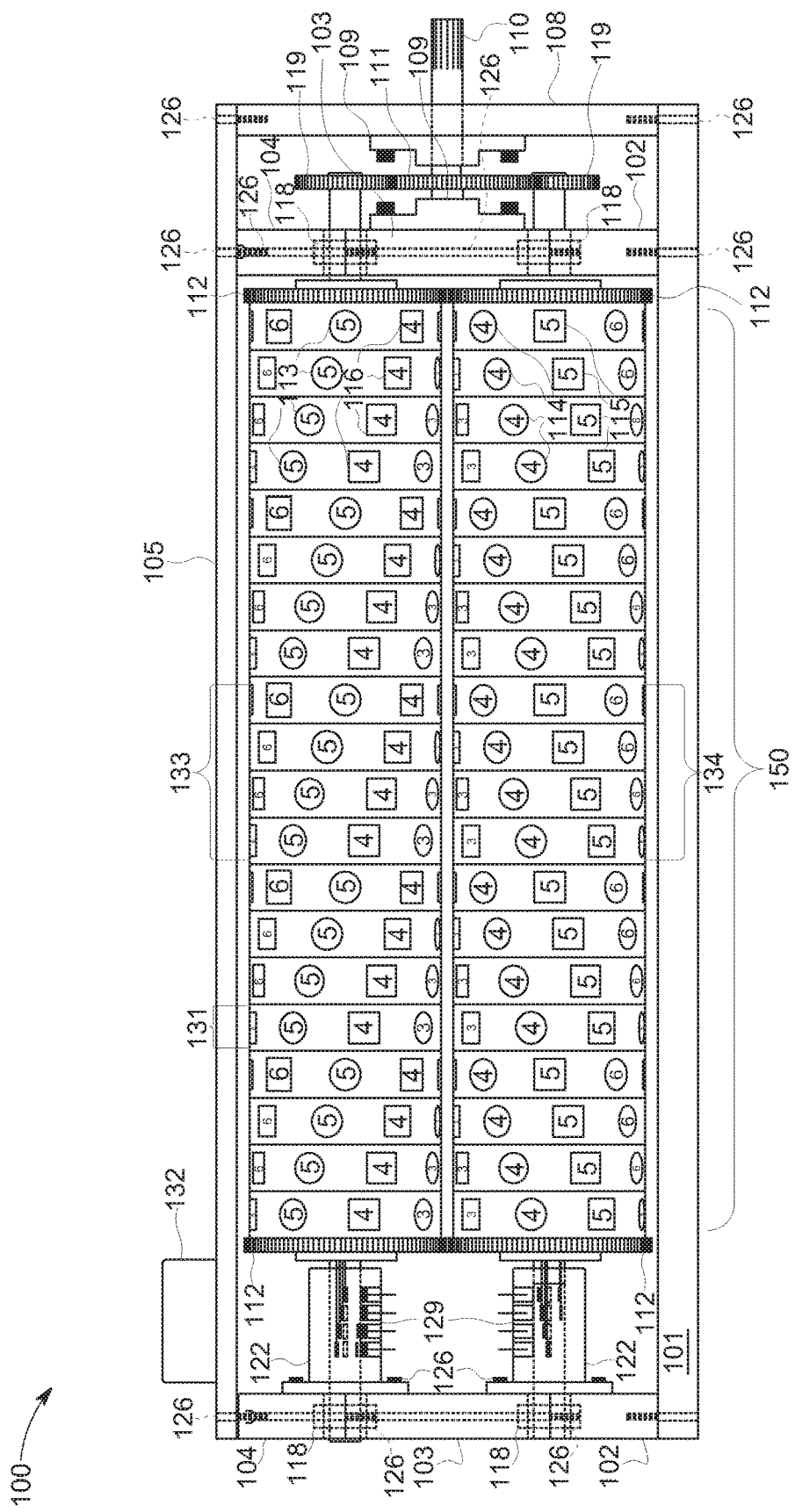
FIG. 4 is a left side view of the magnetic drive propulsion system of FIG. 1.

Referring now to FIGS. 1-4, a magnetic drive propulsion system 100 (referred to generally as the "system 100") is shown according to an exemplary embodiment of the subject technology. The system 100 generally includes a plurality of drive modules 150 arranged in juxtaposition to provide a combined torque output when operated. Each drive module 150 includes a plurality of magnets (113; 114; 115; 116) (described in detail below). When operated, magnets of the same polarity from different drive modules 150 are synchronized to face each other and repel providing an impetus to the respective modules 150 which drive axles 120; 121 to turn. The drive modules 150 may be generally cylindrical and positioned so at least two modules have their longitudinal axes in parallel to one another. In the exemplary embodiment shown, four drive modules are arranged in parallel however it will be understood that the system 100 generally uses two or more drive modules arranged to spin from each other. Operation of the system 100 turns the drive modules 150 so that an output torque is provided from axles 120; 121 which in turn provide power output to output drive shaft 110 (FIGS. 2-4).

Figure 14:
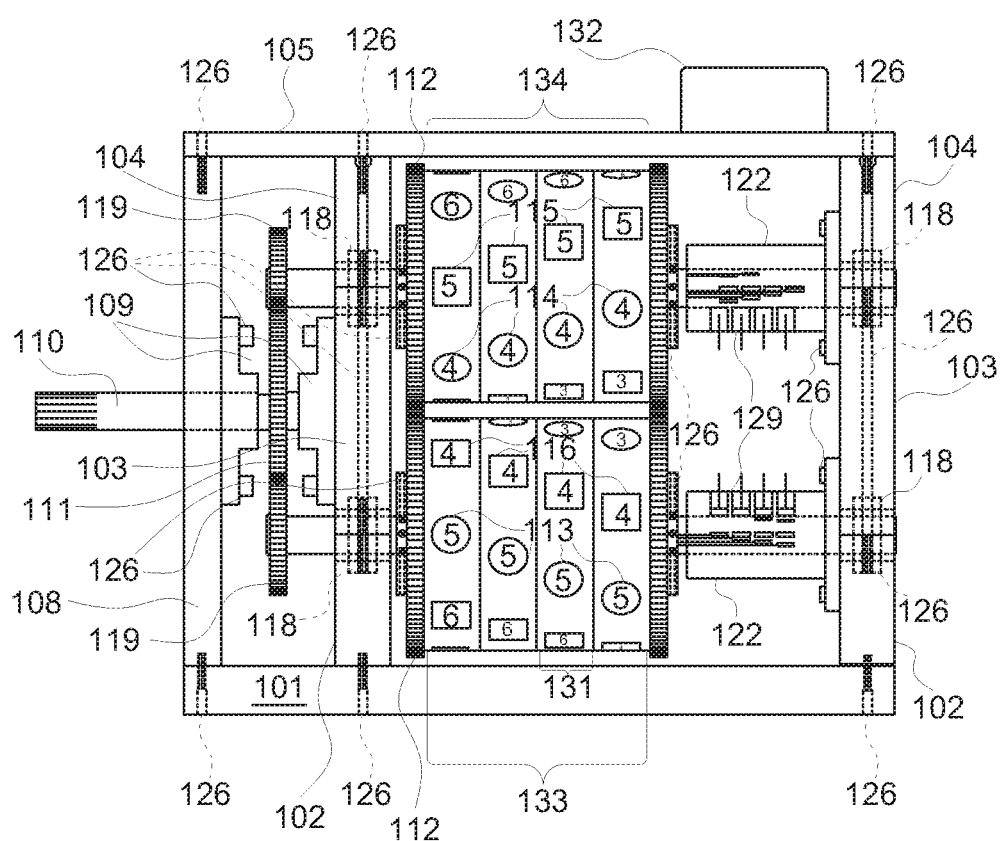
FIG. 14 is a right side view of a magnetic drive propulsion system according to another exemplary embodiment of the subject technology.
Figure 15:
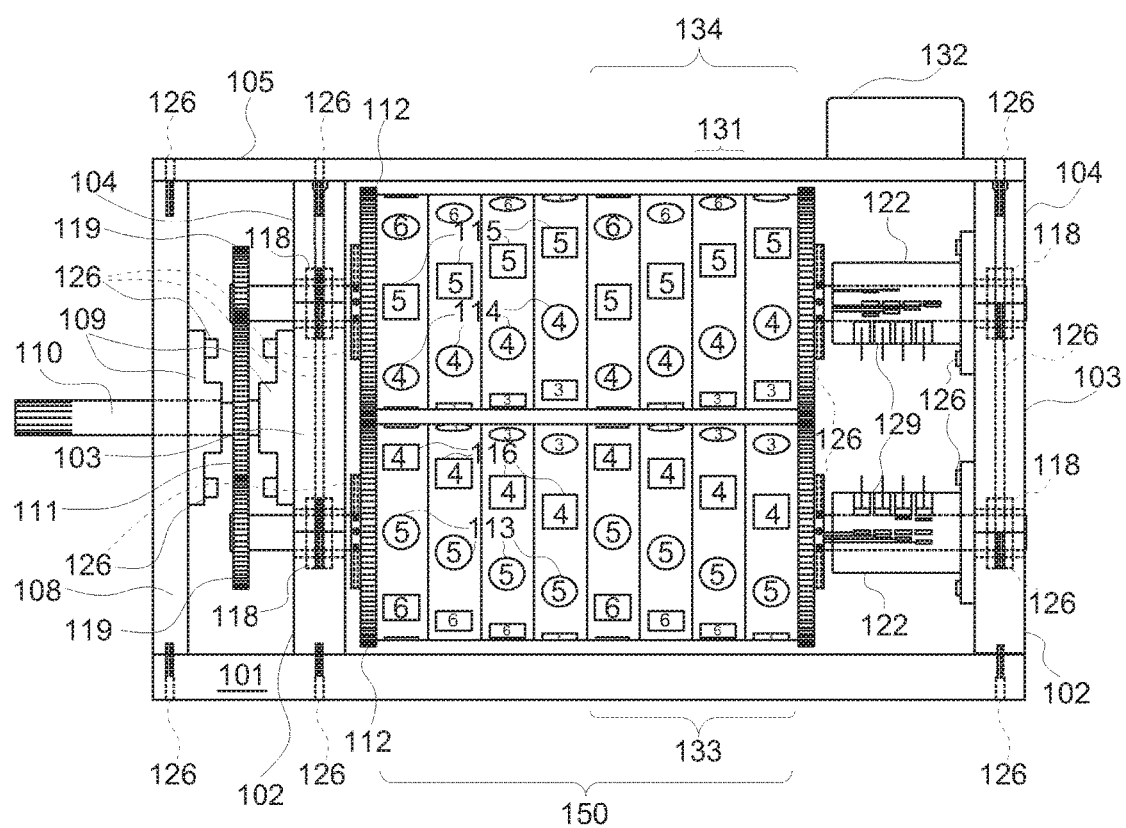
FIG. 15 is a right side view of a magnetic drive propulsion system according to yet another exemplary embodiment of the subject technology.
Figure 16:
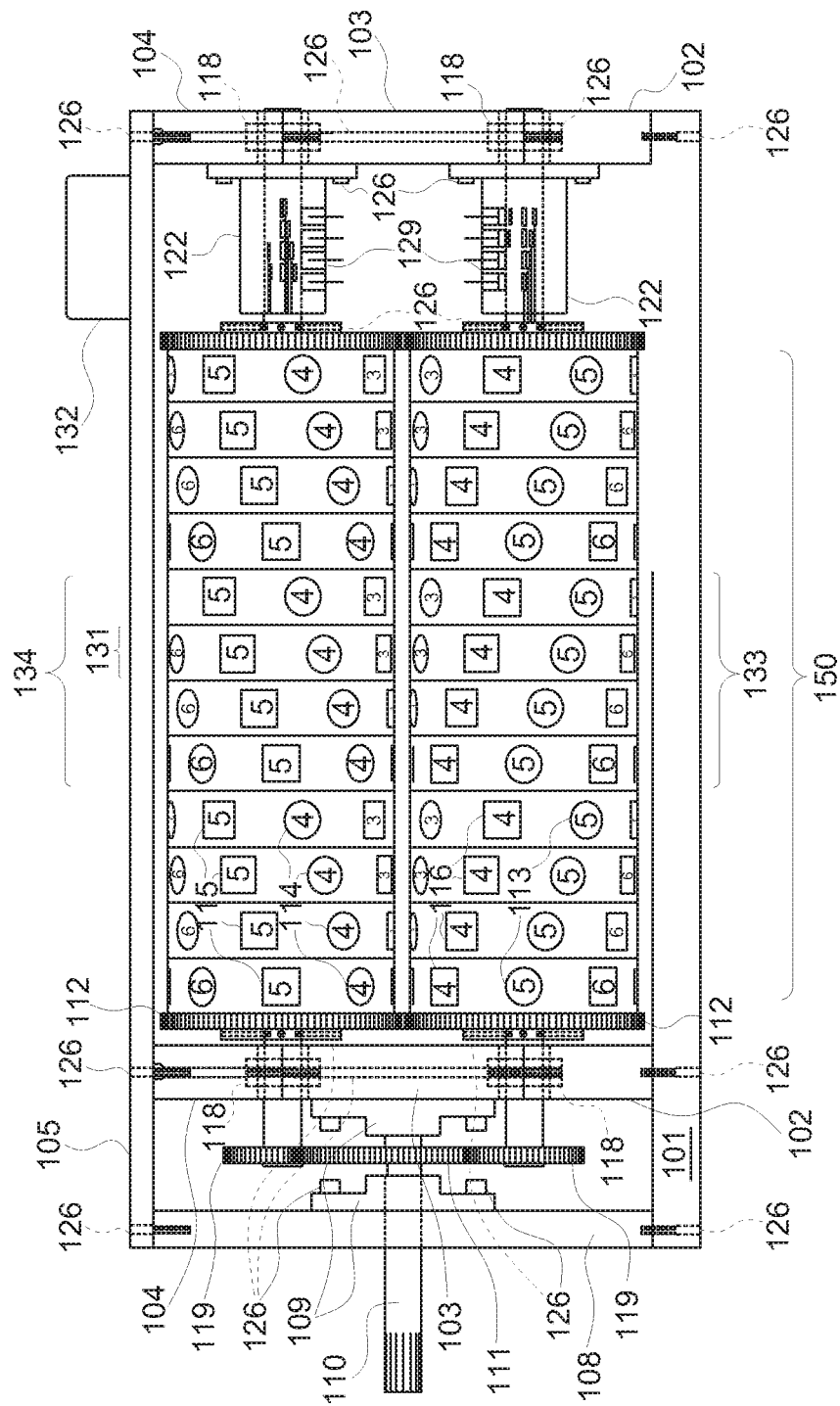
FIG. 16 is a right side view of a magnetic drive propulsion system according to still yet another exemplary embodiment of the subject technology.
Figure 17:
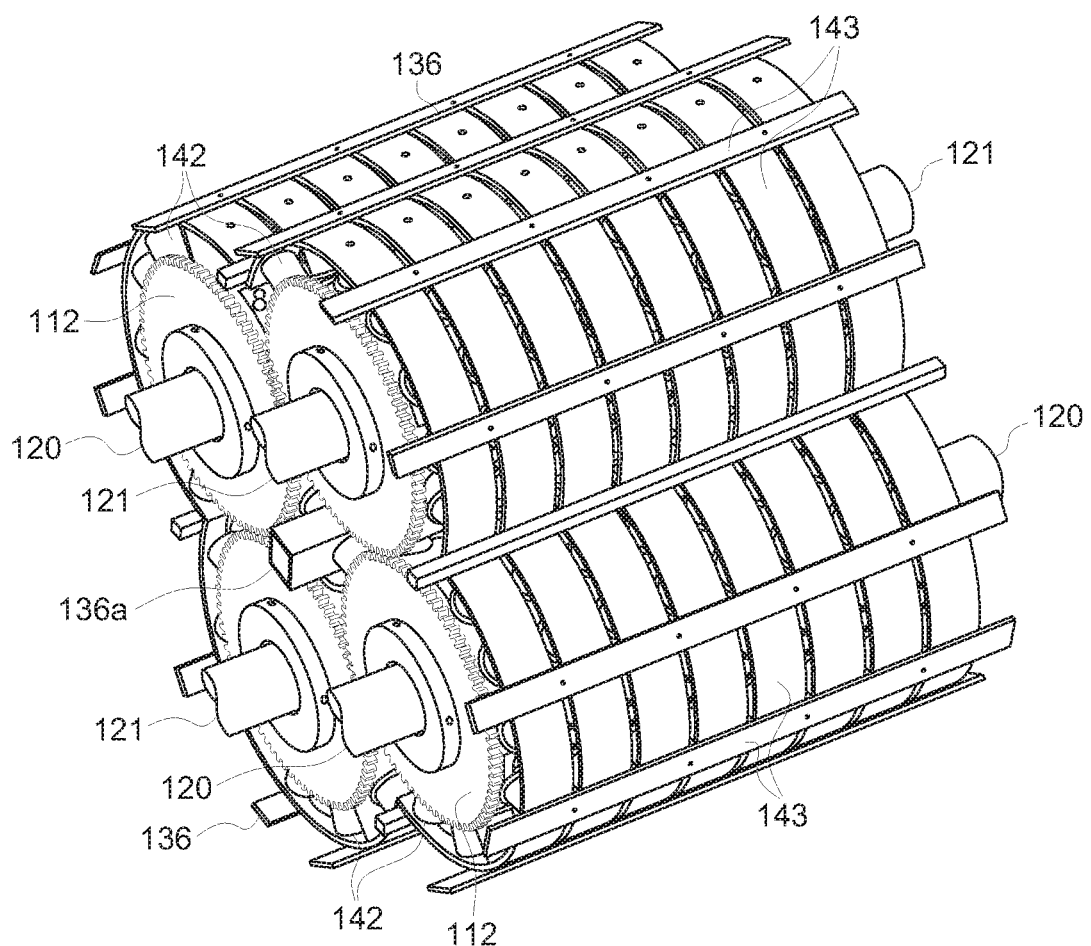
FIG. 17 is perspective view of a magnetic drive propulsion system including a stator according to an exemplary embodiment.
Figure 18:
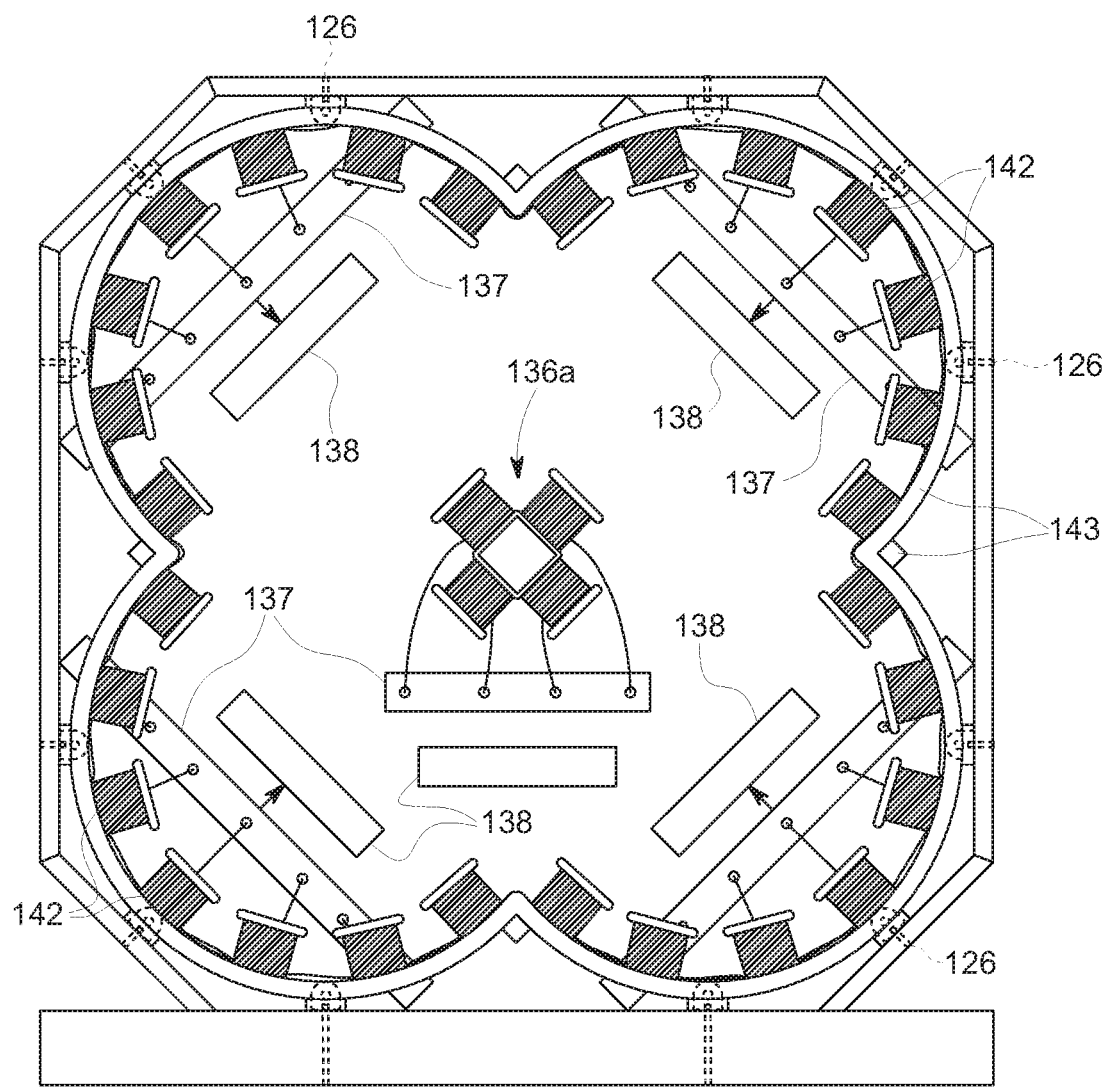
FIG. 18 is a top view of the magnetic drive propulsion system of FIG. 17.
Figure 19:
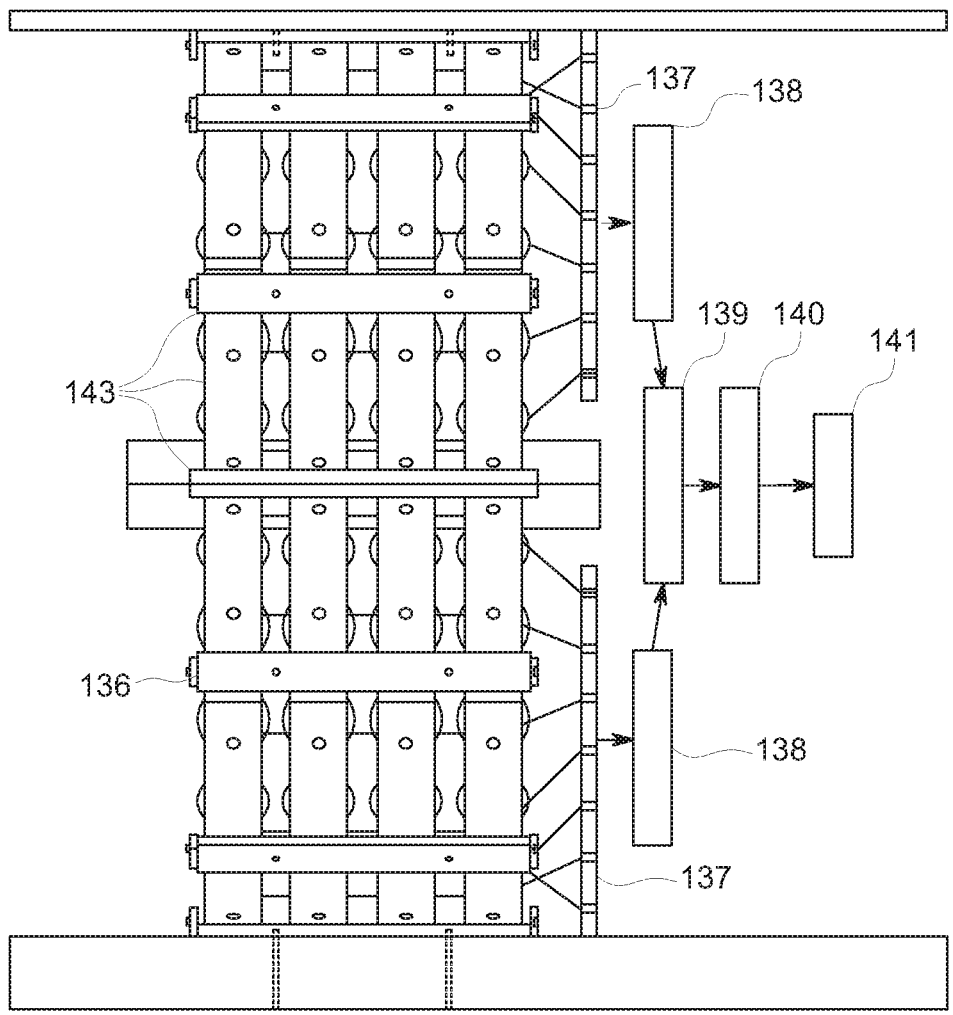
FIG. 19 is a top view of the magnetic drive propulsion system of FIG. 17.
Figure 20:
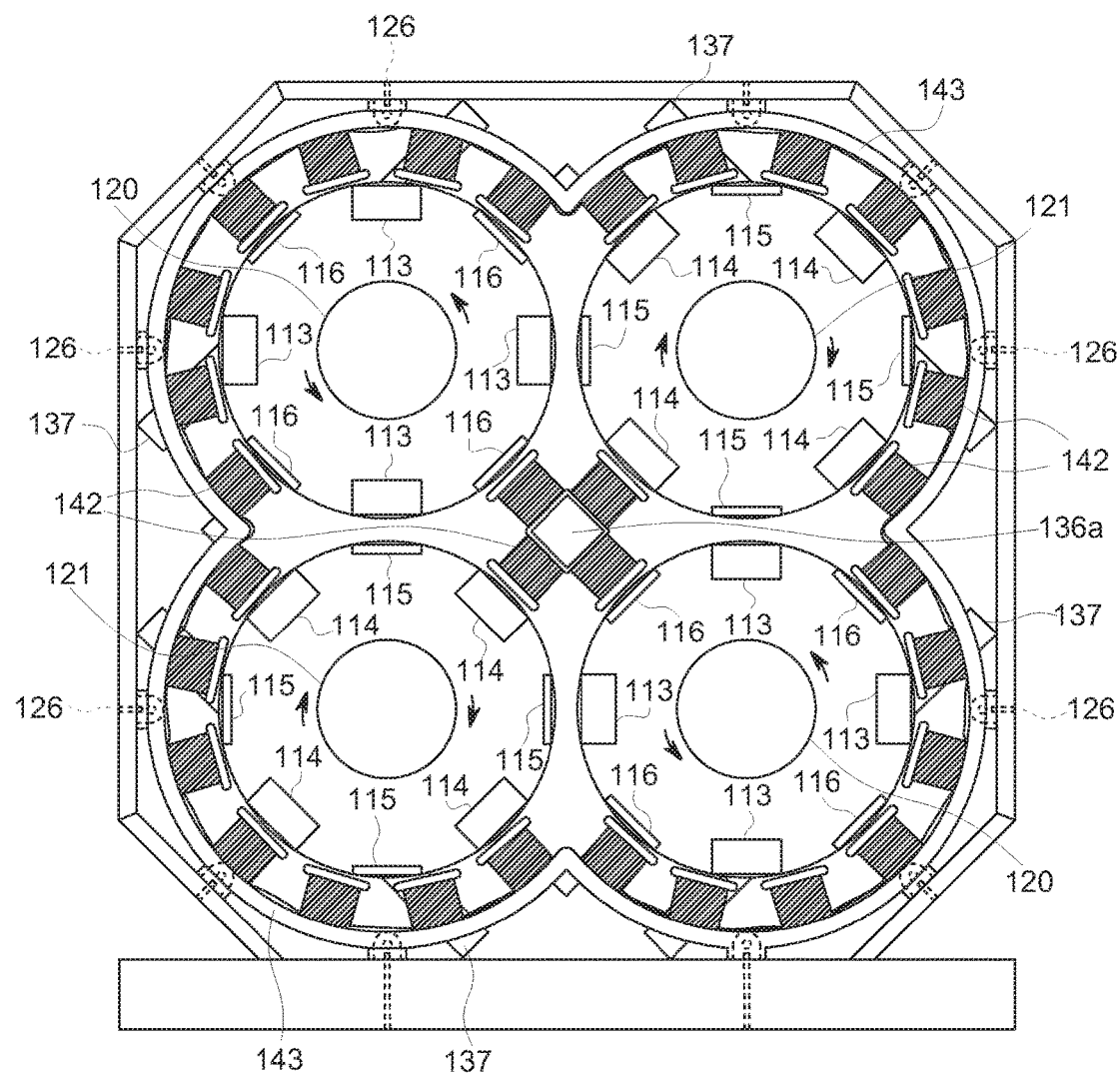
FIG. 20 is an end cross-sectional view of the magnetic drive propulsion system of FIG. 17.
Figure 21:
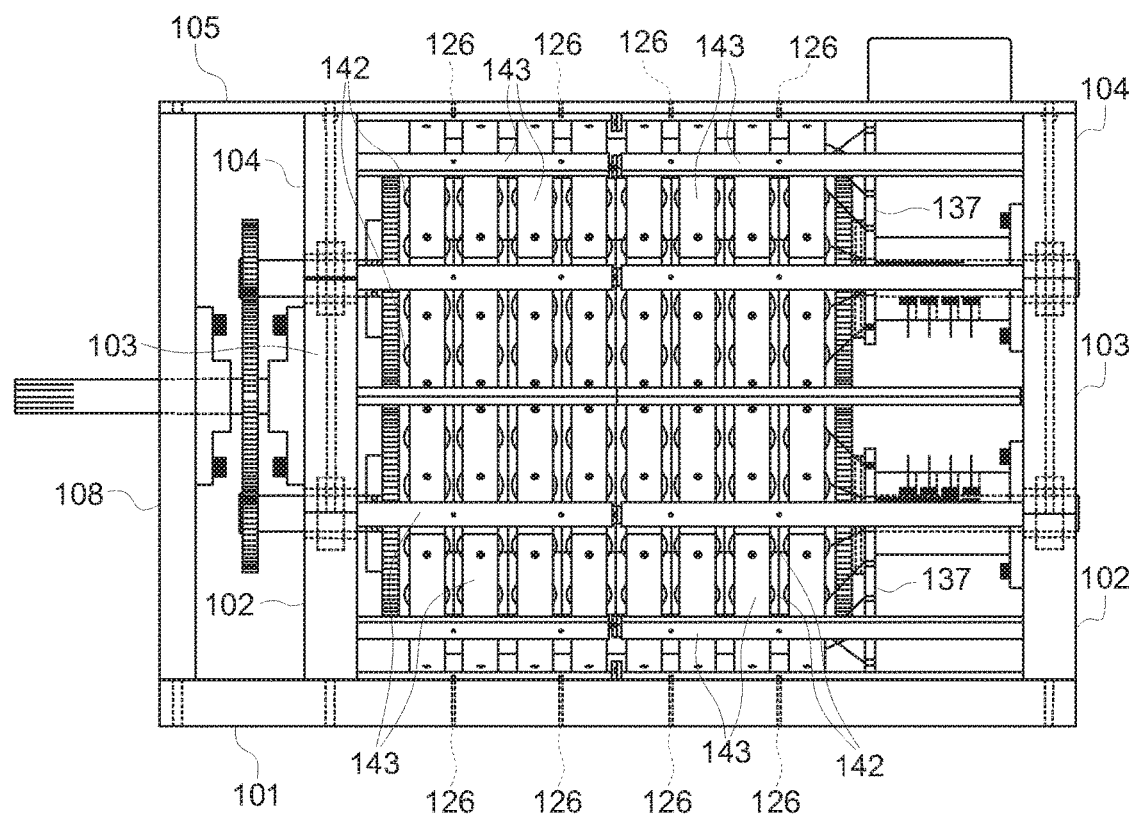
FIG. 21 is a side view of the magnetic drive propulsion system of FIG. 17.
Figure 22:
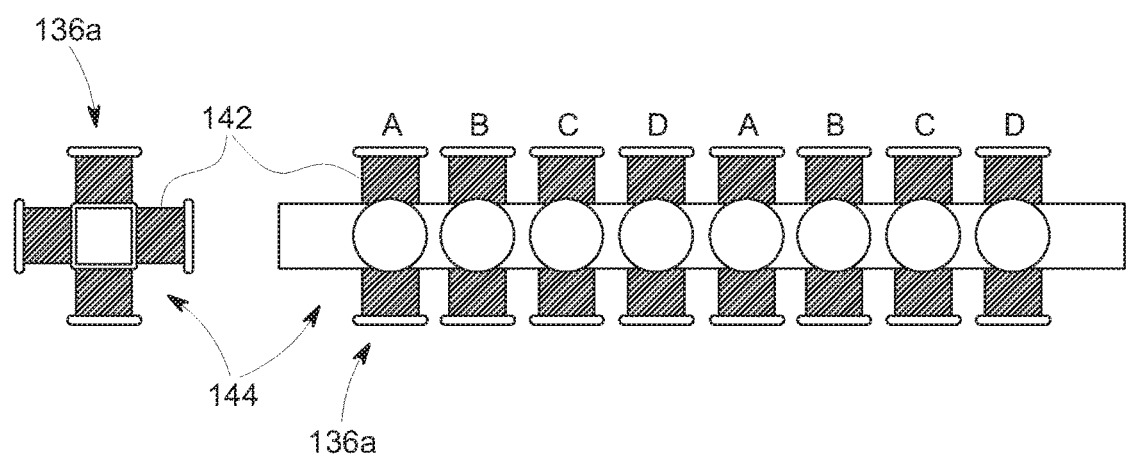
FIG. 22 is a hybrid schematic of end/side views of a stator core of the magnetic drive propulsion system of FIG. 20 with the side view being a partial view.

The drive modules 150 may include one or more rotor blocks 155 (also sometimes referred to as rotor assemblies 155). The exemplary embodiment shows drive modules 150 including five rotor blocks 155 each, however it will be appreciated that aspects of the subject technology allow for more or less rotor blocks 155 depending on the desired output (as shown in FIGS. 14-16). The rotor blocks 155 generally include a plurality of radial magnetic assemblies (RMA) 131. In an exemplary embodiment, a RMA 131 may include 8 magnets (113; 114; 115; 116) facing outward from an exterior surface and alternating between N-pole and S-pole polarities. The magnets (113; 114; 115; 116) include permanent magnets and field coil electromagnets.

Figure 9:
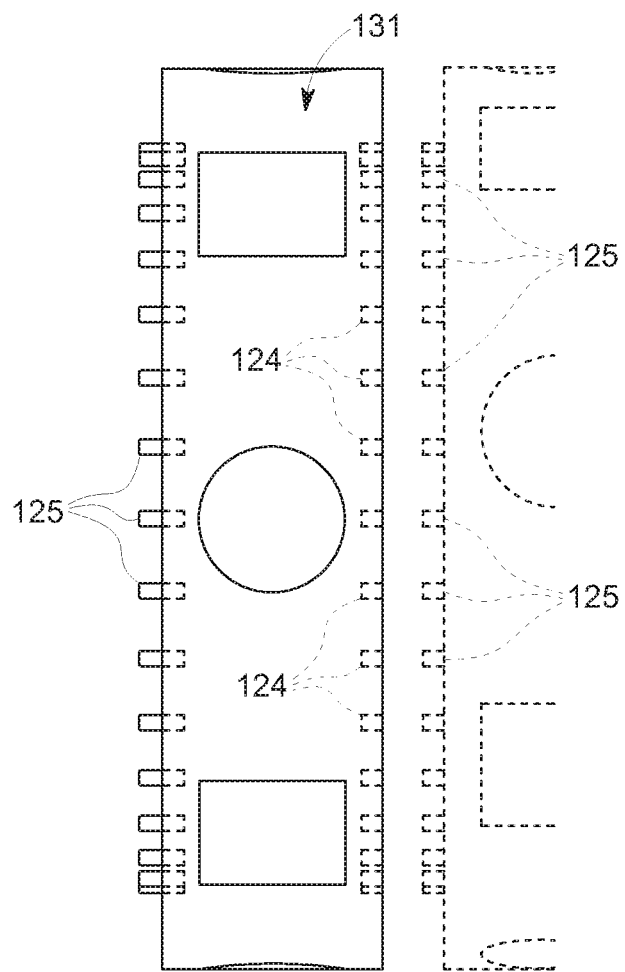
FIG. 9 is an enlarged and partial exploded view of a rotor block according to an exemplary embodiment of the subject technology depicting an RMA (radial magnetic assembly) with either N-pole field coils and S-pole magnets or S-pole field coils and N-pole magnets.
Figure 10:
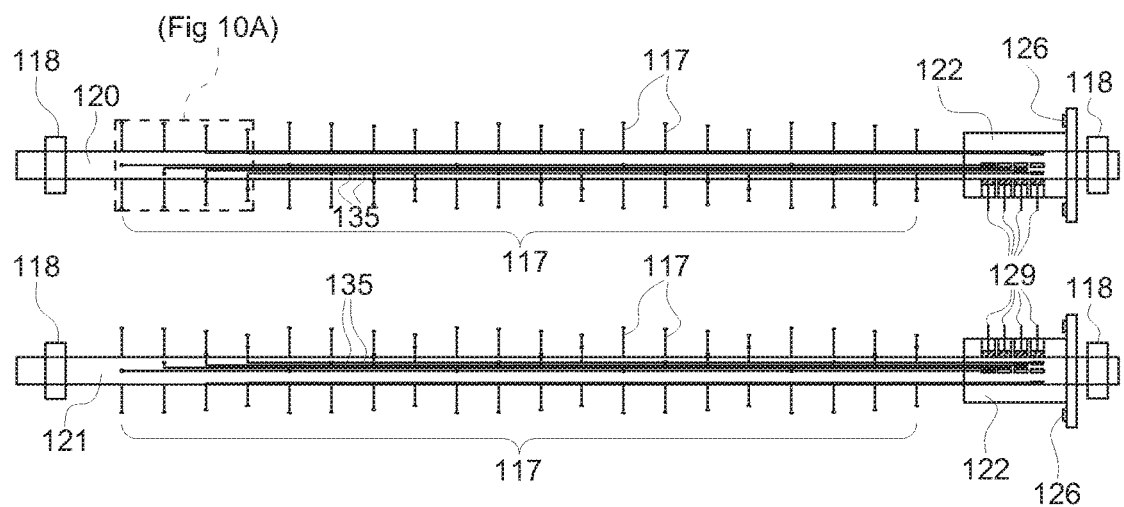
FIG. 10 is a side schematic view of electrical connections through axles according to an exemplary embodiment of the subject technology.
Figure 10A:
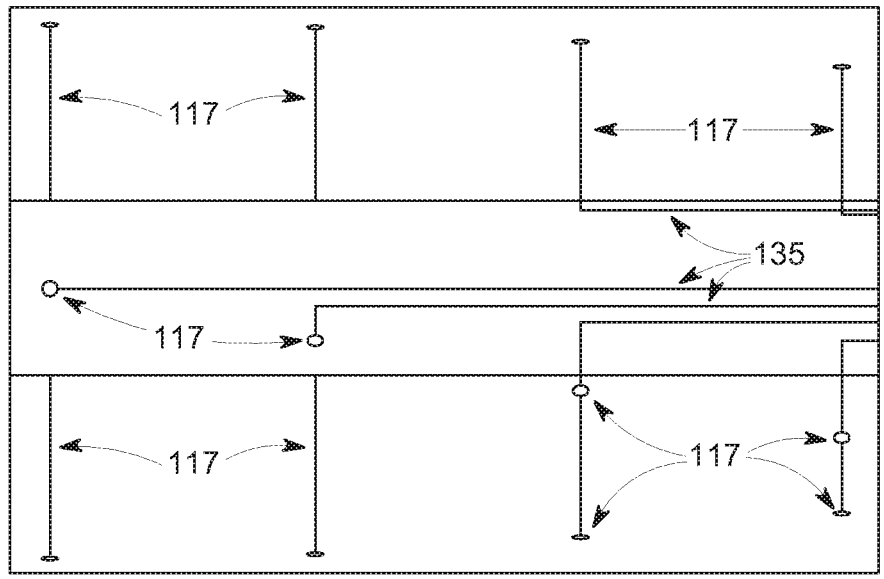
FIG. 10A is an enlarged view of the rectangle 10A of FIG. 10.
Figure 10B:
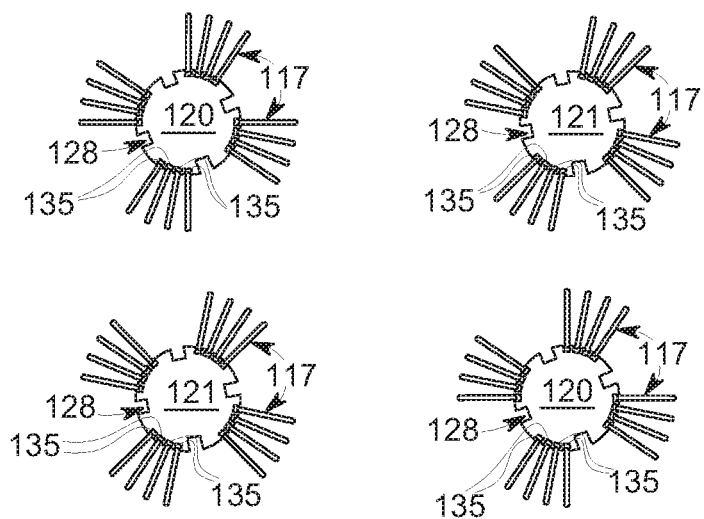
FIG. 10B is an enlarged end view of electrical tine positions on radial magnetic assemblies according to an exemplary embodiment of the subject technology.
Figure 11:
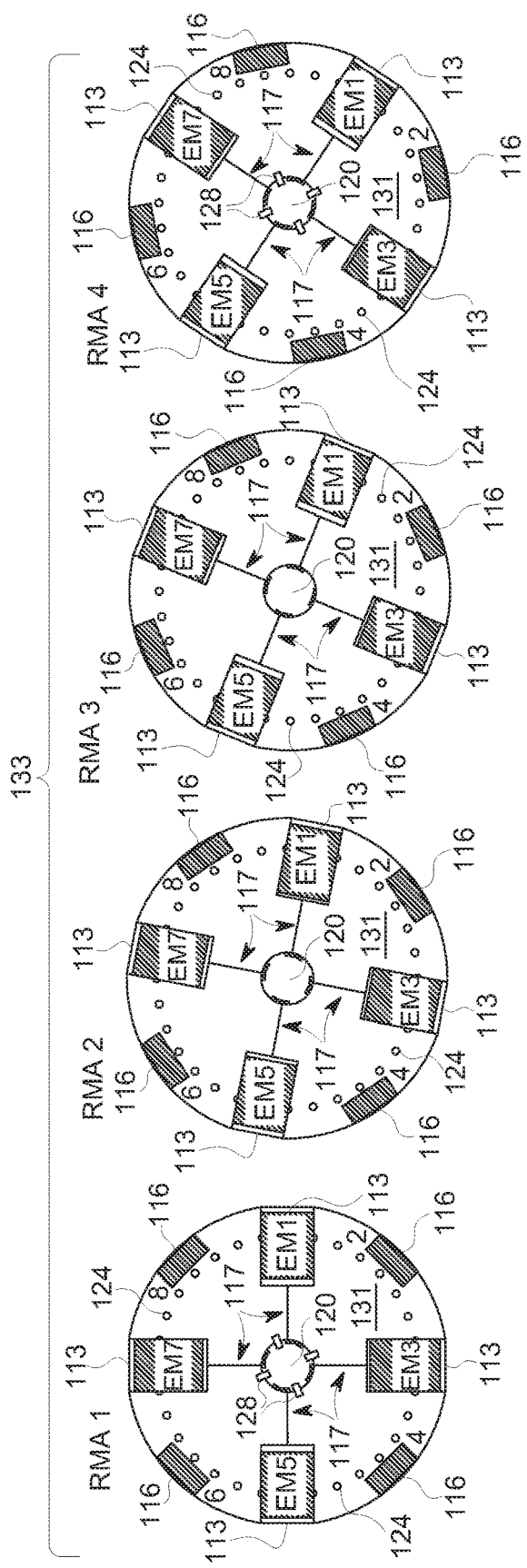
FIG. 11 is a schematic of end views of the RMAs of the top rotor block of FIG. 5 each rotated to the counterclockwise by an offset of 11.25° from the previous RMA.
Figure 12:
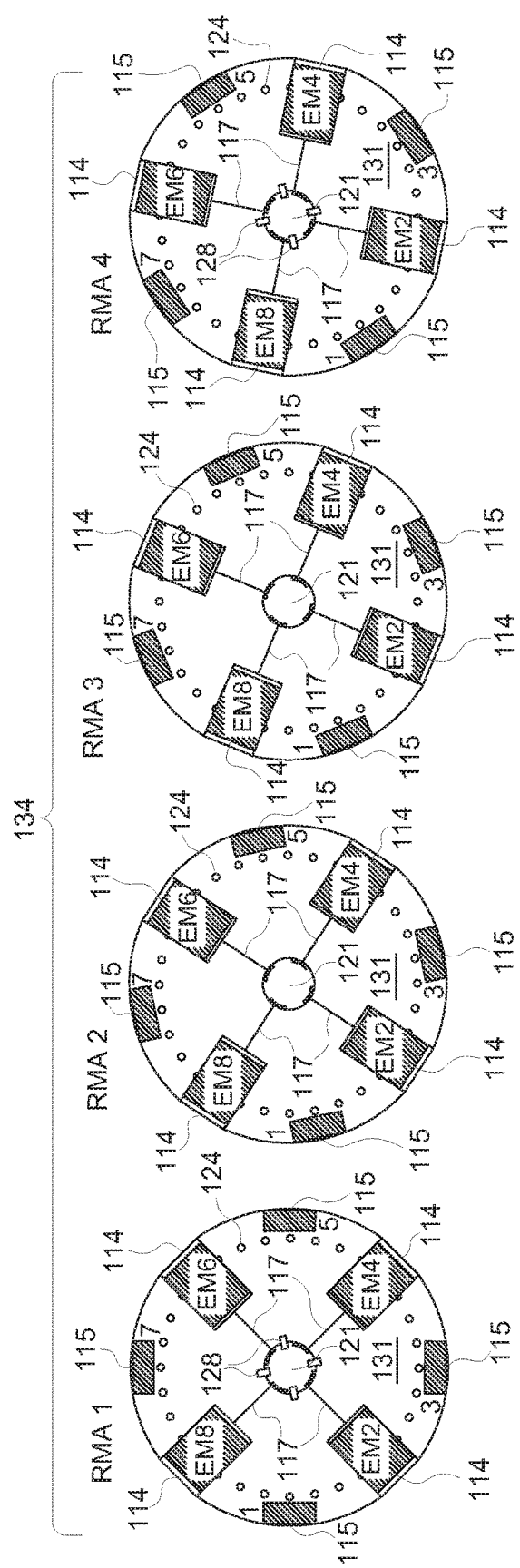
FIG. 12 is a schematic of end views of the RMAs of the top rotor block of FIG. 6 each rotated to the counterclockwise by an offset of 11.25° from the previous RMA.

The RMA 131 may be milled out of aluminum round stock, with round holes milled of sufficient diameter and depth to accommodate the dimensions of the electromagnets 113; 114 every 90 degrees around the outer radius for insertion of field coils, and squared milled recesses every 90 degrees for insertion of the permanent magnets (115; 116) which may be for example, NdFeB (Grade 35) magnets. Thirty two (32) ⅛" holes 124 may be milled into the front and back of the RMAs 131 and may be offset by 11.25 degree's apart on the inner radius to accommodate ⅛" compression pins 125 (FIG. 9) which are press fitted together to establish a 11.25 degree's offset of magnets between each RMA 131. Tines 117 (FIGS. 10, 10A, 10B) may conduct current from the axles 120; 121 to the electromagnets 113; 114) in the RMAs 131.

Referring again to FIGS. 1-4, odd numbered circles represent N-pole electromagnets (B-fields). Even numbered circles represent S-pole electromagnets (B-fields). Odd numbered squares represent N-pole permanent magnets (H-fields). Even numbered squares represent S-pole permanent magnets (H-fields). The magnets (113; 114; 115; 116) are numbered so that magnets of the same number are synchronized to face each other as synchronization gears 112 turn on ends of the modules 150. 20. The upper left and lower right drive modules 150 (FIG. 1) include odd numbered electromagnets 113; 114 (B-fields). The upper right and lower left drive modules 150 (FIG. 1) include even numbered electromagnets 113; 114 (B-fields). The electromagnets (113; 114) (B-fields) may be offset from the permanent magnets (115; 116) (H-fields) by 45 degrees. Each electromagnet (113; 114) (B-fields) may be spaced equidistant from any adjacent permanent magnet (115; 116) (H-fields)

Figure 5:
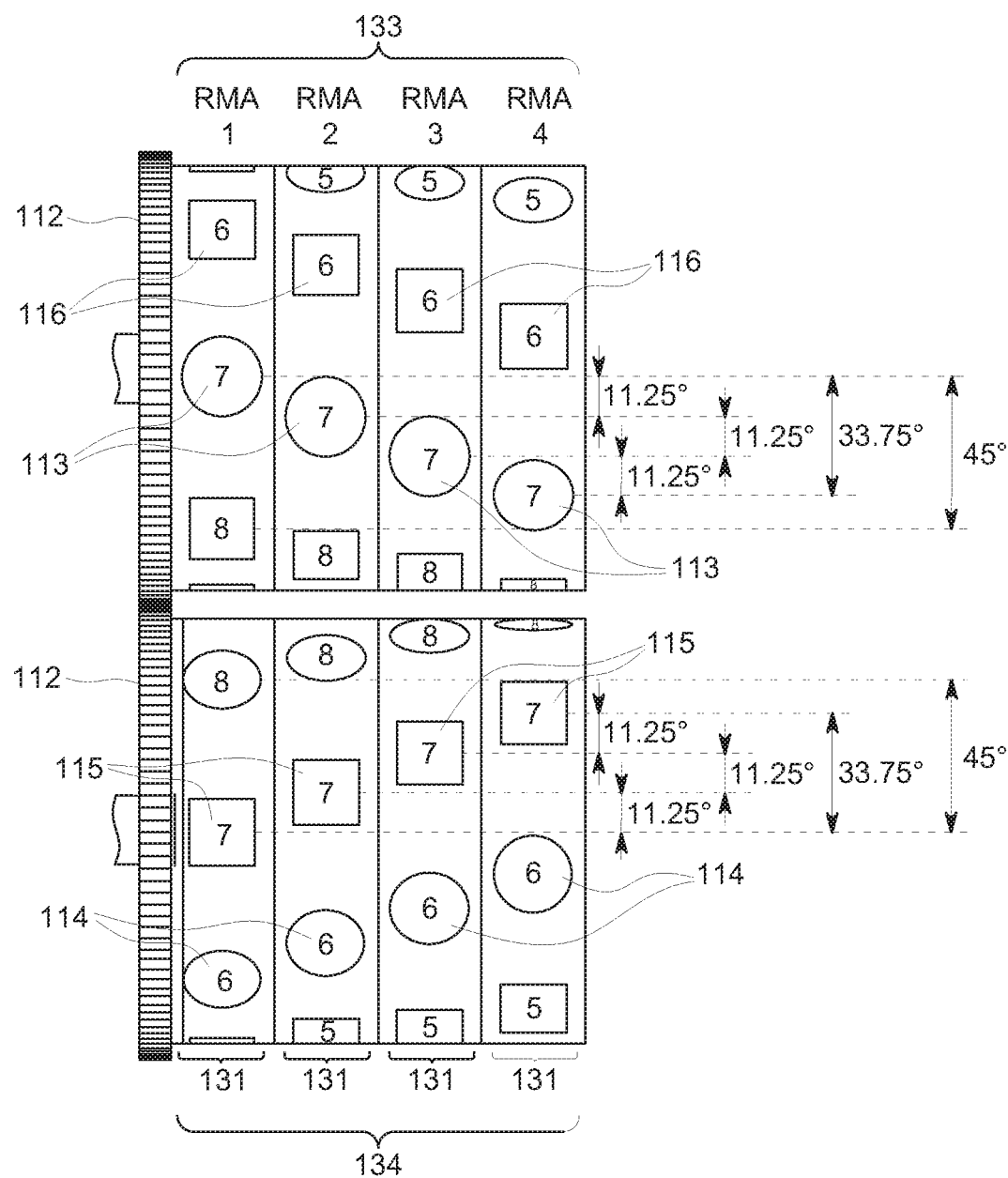
FIG. 5 is an enlarged partial view of the leftmost radial magnetic assemblies shown in FIG. 2.
Figure 6:
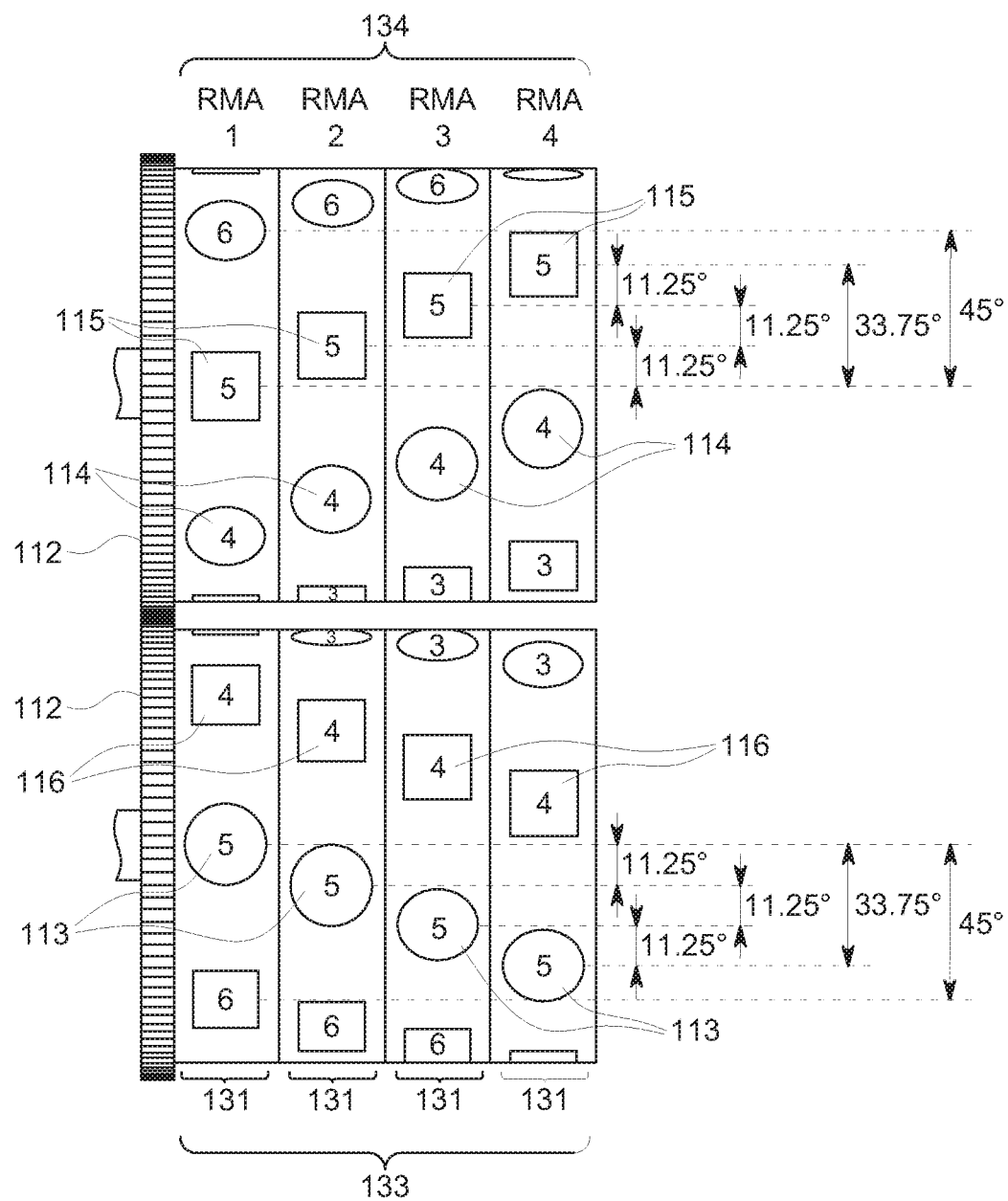
FIG. 6 is an enlarged partial view of the leftmost radial magnetic assemblies shown in FIG. 3.
Figure 7:
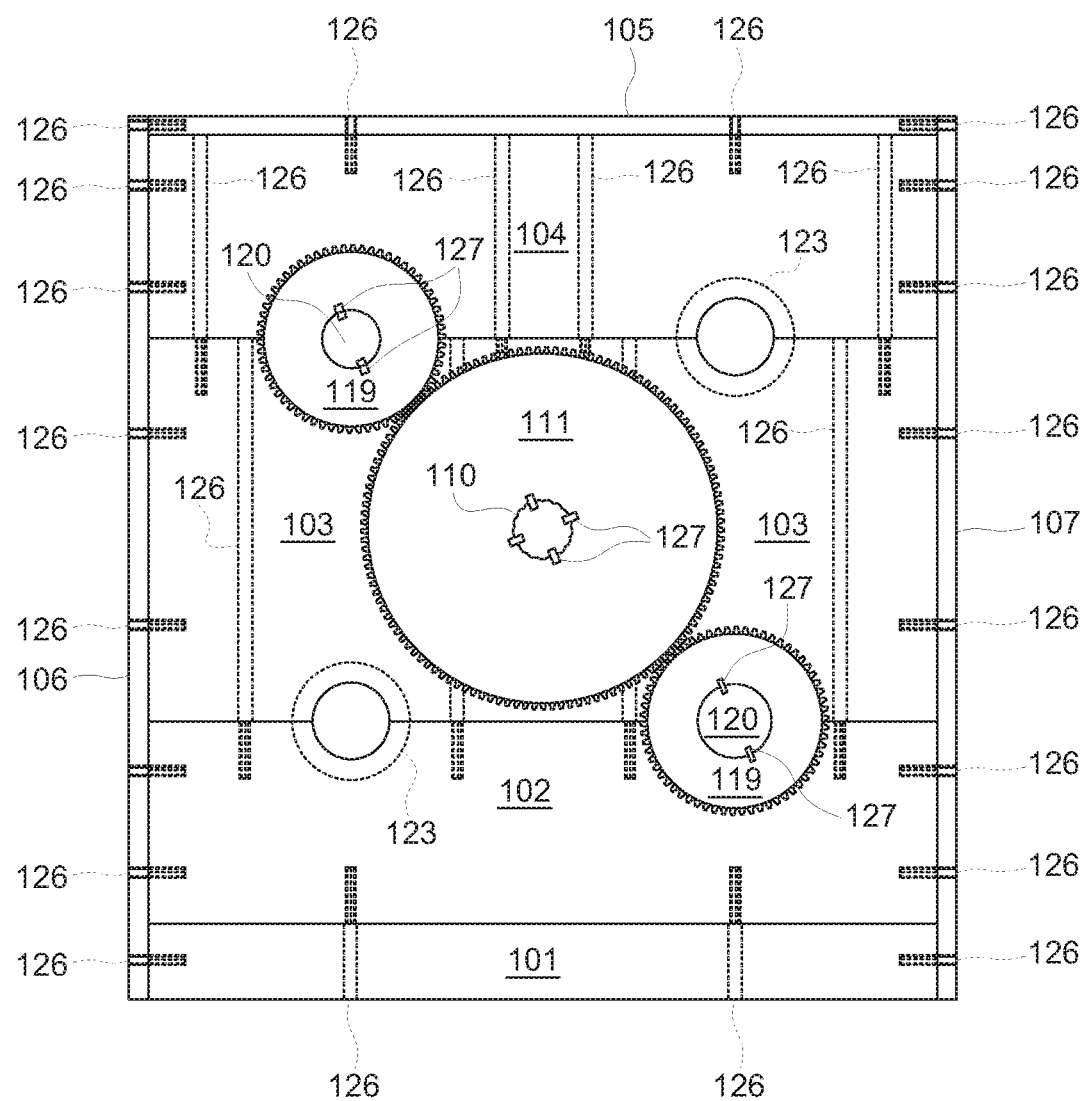
FIG. 7 is a cross-sectional end view of the magnetic drive propulsion system of FIG. 2 depicting a front of cradle assembly with two planetary torque transfer gears and a single output shaft gear.
Figure 7A:
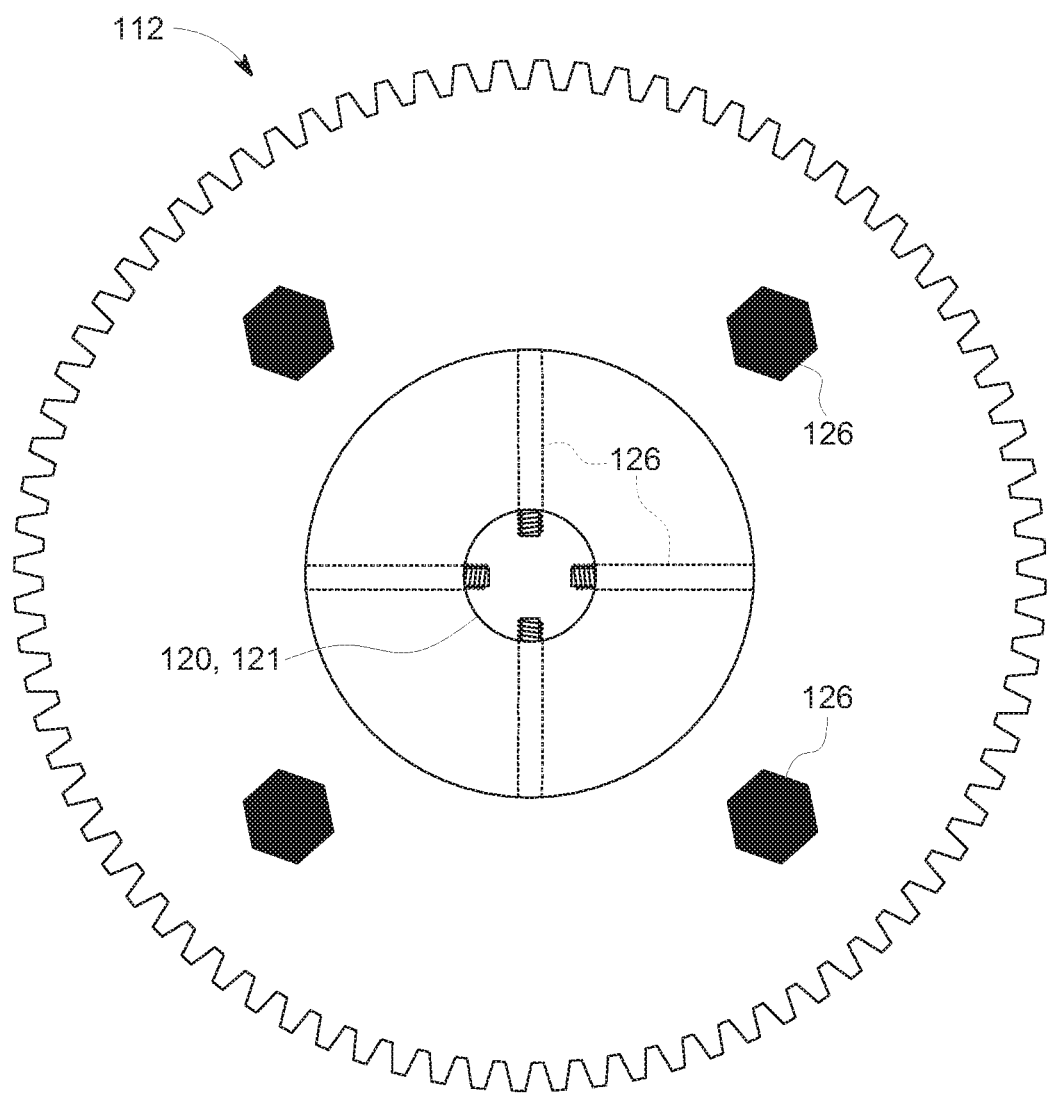
FIG. 7A is an enlarged end view of a synchronization gear of FIG. 2.
Figure 7B:
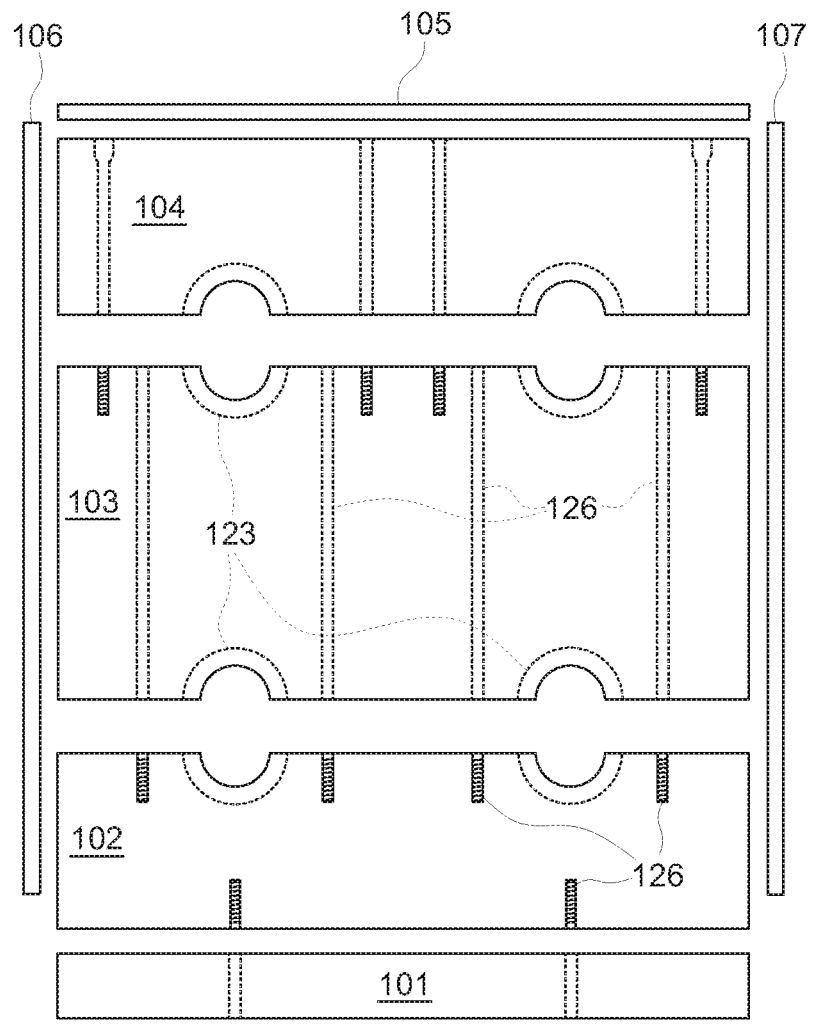
FIG. 7B is a partial front view of cradle housing of the system of FIG. 2.
Figure 8:
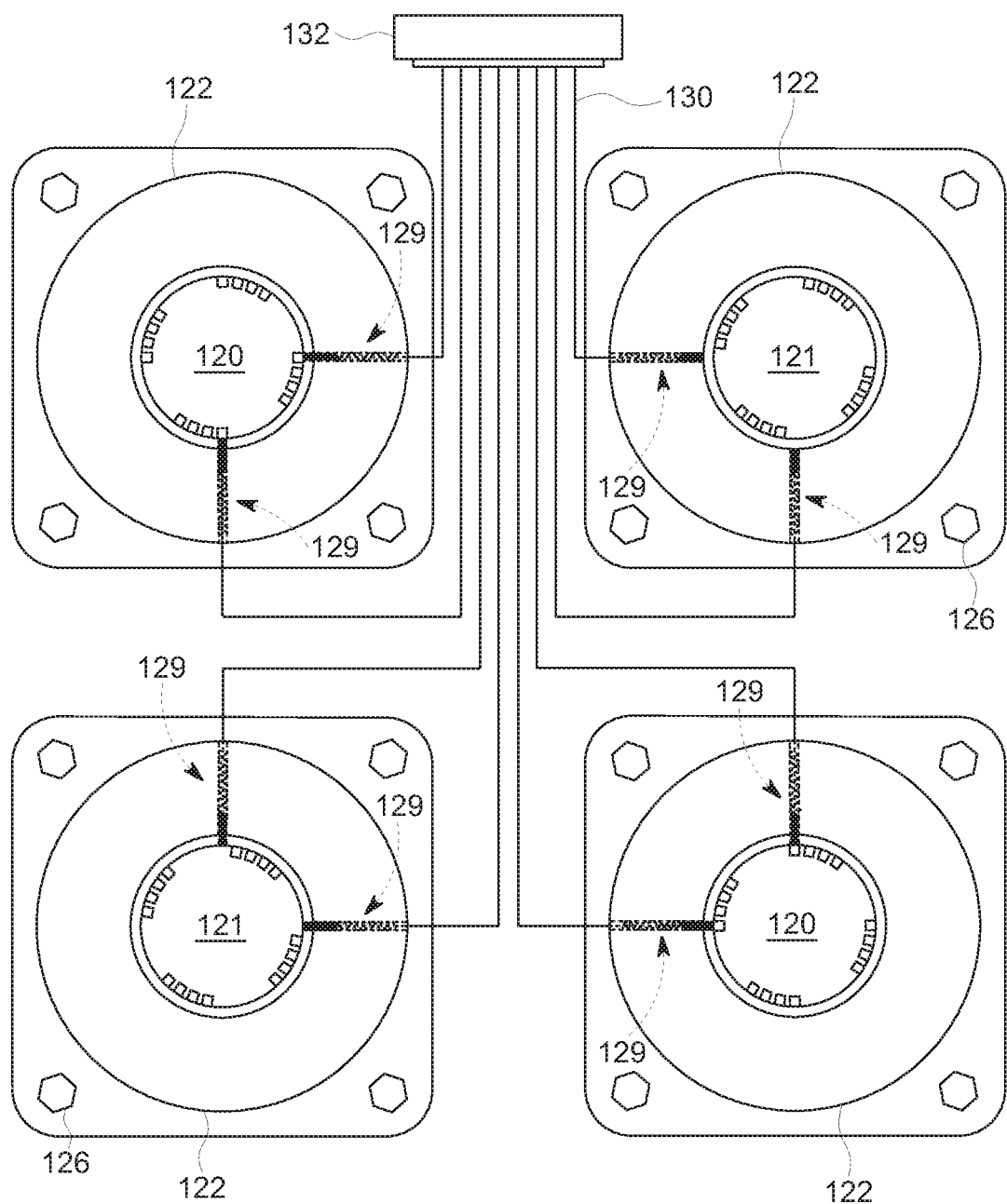
FIG. 8 is a rear end schematic view of electrical connections powering the drive modules of FIG. 2 depicting firing sequences of alternating diagonal rotors.

Referring still to FIGS. 1-4 and concurrently to FIGS. 5 and 6, in an exemplary embodiment, rotor block 155 may include for example four RMA's 131 (designated "R1", "R2", "R3", "R4") juxtaposed longitudinally along an axle 120 or 121. The magnets (113; 114; 115; 116) may be arranged so that a same magnet type (for example N-pole electromagnets represented by the same number) are adjacent to one another and any two adjacent magnets are offset radially from the center of the rotor block 155 by an angle of 11.25 degrees. Same type magnets (113; 114; 115; 116) on adjacent rotor blocks 155 may be offset by 33.75 degrees (for example, the last square 4 of the first rotor block 155 on the lower right drive module 150 is radially 33.75 degrees ahead of the first square 4 of the $2^{nd}$ rotor block 155 on the same drive module 150).

Referring now to FIGS. 2-4, 7, 7A, and 7B, the following describes an exemplary embodiment of housing for the system 100 connecting the axles 120; 121 to the planetary gear 119. A base plate 101 provides a deck structure to support cradle bases 102 fore and aft an end plate 108 which is drilled and tapped to accommodate threaded fasteners 126 for structural integrity. The cradle, bases 102, cradle center 103, and cradle top 104 may be support structures with half-moon milled cutout recesses 123 (FIG. 7B) for mounting rotor bearings 118. A top plate, enclosure 105 may connect to left plate 106, right plate 107, top cradle 104, and end plate 108. The end plate 108 may be a gear housing enclosure panel, with surface mounted flange bearings 109 drilled and tapped to accommodate output drive shaft 110. Roller bearings 109 may be surface mount flange bearings supporting the output drive shaft 110. The output drive shaft 110 may be secured to the cradle center 103 and protrudes through a hole in end plate 108. A drive gear 111, receives torque from two counterclockwise rotating planetary gears 119 (See also FIG. 7) connected to axles 120 which are driven by the rotation of the drive modules 150 and converts this force to clockwise rotation of the output drive shaft 110. The synchronization gears 112 may include a 1:1 ratio for all drive modules 150. Fasteners may secure the gears 112 to the front and back of drive modules 150 along with set screws to secure gears to the axles 120 or 121. Rotor bearings 118 may be press fitted to the axles 120; 121 after the drive modules 150 are attached. Notching keyways 127 (FIG. 7) may be provided for brass keys to adhere gears 119 to shafts 120 by press fit. Notching keyways 128 secure rotor block 133,134 to axles 120; 121.

Referring now to FIGS. 2-4, 10, 10A, and 10B, the following describes an exemplary electrical connection in the system 100. The system 100 may include a power supply 132 which may be an AC/DC power supply which may include for example, a transformer, a full wave bridge rectifier, filter capacitors, and load resistors or any suitable off the shelf, variable power supply. The system 100 may be a brush type system however brushless embodiments may also be used. For example, brushes 129 may be spring loaded assemblies contained within a brush housing 122 with a current carrying conductor 135 attached in parallel from the output side of a power supply 132. Wiring 130 may include current carrying conductors 135 run in parallel of sufficient gauge and length to transfer power from the output side of the power supply 132 to the spring loaded brushes 129 in brush housings 122. Imbedded current carrying conductors 135 may supply parallel power to all field coils in electromagnets 113; 114 through axles 20 and 21. Current from the output side of the power supply 132 travels through the parallel wiring 130 to the brushes 129 contained within the brush housings 122 and transfers that power from the brushes 129 to the current carrying conductor 135 to the tines 117 to energize the field coils in electromagnets 113; 114 in pairs of two (2) at 90 degree right angles, repelling off of the permanent magnets 115; 116 on an adjacent drive module 150.

Figure 13:
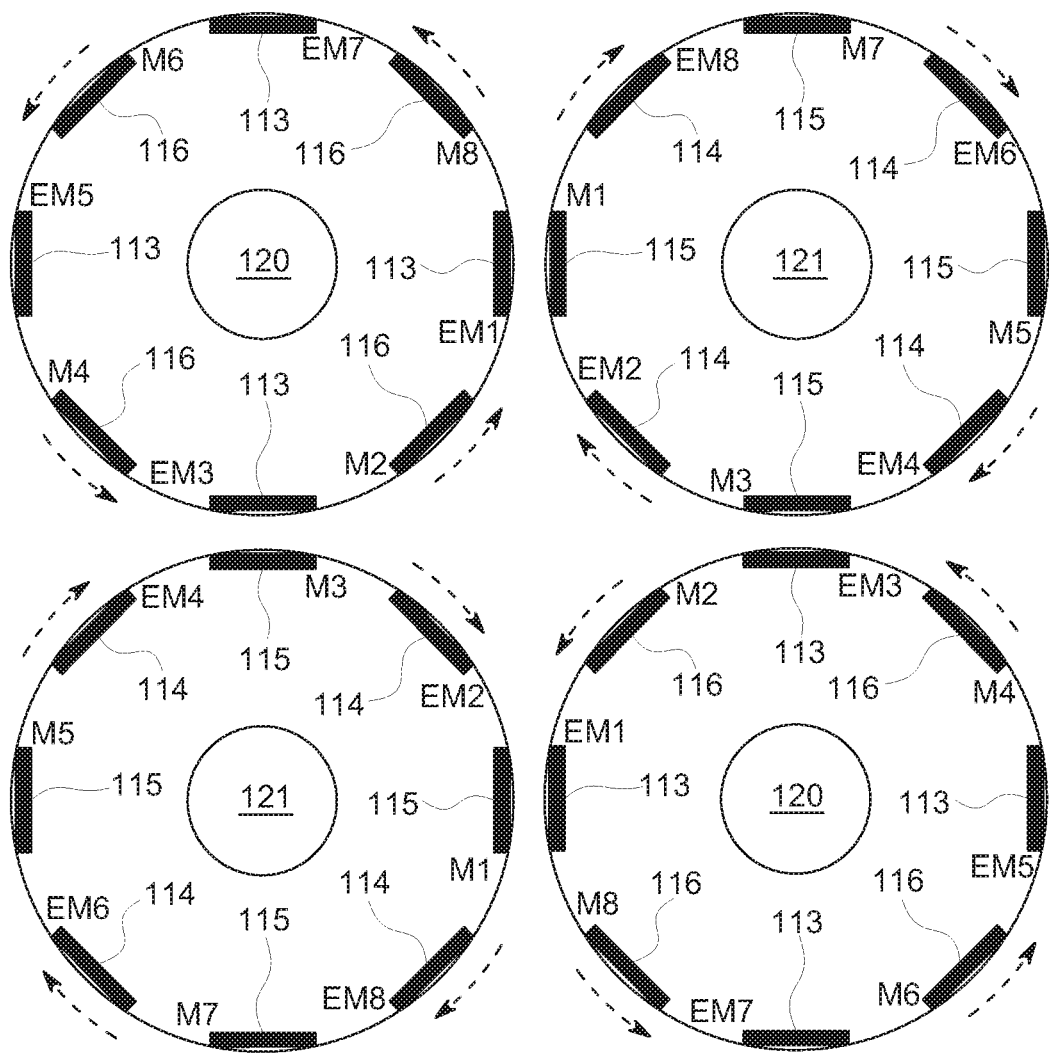
FIG. 13 is an end schematic view of the drive modules of FIG. 2 showing repellant relationships among permanent magnets and electromagnets of adjacent drive modules according to an exemplary embodiment of the subject technology.

As may be appreciated, while the foregoing was described primarily in the context of two adjacent drive modules 150, the system 100 may be arranged as shown so that electromagnets (113; 114) of a drive module 150 may be synchronized with corresponding like numbered permanent magnets (115; 116) of two separate drive modules 150 so that four drive modules 150 may provide concurrent, synchronized output. Referring now to FIGS. 1 and 11-13, operation of the system 100 is shown from a perspective and end views to show four different pairs of like numbered, opposite polarity magnets synchronized to face each other and repel at the same time. In operation, like numbered magnets of the same polarity, but one being an electromagnet 113 or 114 on a first rotor block 155 of a first radial magnetic assembly 131 of a first drive module 150 and the other being a permanent magnet 115 or 116 on a first rotor block 155 of a first radial magnetic assembly 131 of a second drive module 150, are synchronized to face each other. The electromagnets (113; 114) may be inactive until positioned opposing a permanent magnet (115; 116) of the same polarity. For example, magnets 114 may not have a current charge until rotated into position to face magnets 116. An exemplary starting position is shown with the alignment of two pairs of an electromagnet 113 and a permanent magnet 115 in the vertical plane (EM1 and M1) and two pairs of an electromagnet 113 and a permanent magnet 115 (EM3 and M3) in the horizontal plane (FIG. 13). When a magnet 113 from one drive module 150 faces a magnet 115 from an adjacent drive module 150, the magnet 113 may be energized which provides a flux density (in Watts) to the magnet 115 (of the same field) to repel each other and induce radial momentum to respective drive modules 150. The corresponding like numbered magnets from the second rotor block of respective drive modules 150 lag behind the first paired up magnets by 11.25 degrees of rotation and when synchronized to face each other, add to the resulting propulsion output power of the respective radial magnetic assemblies 131. Thus as the second set of like numbered magnets from opposing rotor blocks 155 (for example, those magnets on "R2"s of FIGS. 5 and 6) synchronize for repulsion, the first paired up magnets are no longer aligned for repulsion. The radial magnetic assemblies 131 continue to fire up the electromagnets 113; 114) in sequence with corresponding permanent magnets 115; 116 to provide continuous radial momentum driving respective axles 120 and 121 which in turn transfer torque to the planetary gear 119.

The magnitude of output from the subject technology is dependent on the size of RMAs 131 diameter N, gear pitch circle N, the number of rotor blocks 155 which determines axle (120; 121) length (see for example FIGS. 14-16), and the power in watts of the N and S pole field coils. The number of radial rotor blocks 155 per shaft determines the output power/torque. For example, a system using four rotor blocks 155 may produce output of approximately 746 W/HP. It may be appreciated that the subject technology provides a unique symmetry in that multiple copies of drive modules 150 may be designed to be stacked infinitely high in columns and infinitely long in rows, with all gears intermeshing to increasing output power and torque. Dual bi-lateral, octagonal, helical, reflective symmetry may be use to describe the relationship between adjacent drive modules 150.

Referring now to FIGS. 17-22, a magnetic drive propulsion system is shown according to another exemplary embodiment. The system shown in FIGS. 17-21 is similar the magnetic drive propulsion system 100 except that a stator 136 is incorporated. The stator 136 may in some embodiments comprise a cage that surrounds each of the modules 120; 121. The cage may comprise bands of structural elements 143 radially aligned with the rotor blocks 155 (FIG. 2) so that the magnets 113; 114; 115; and 116 rotate underneath the bands. The structural elements 143 may comprise for example aircraft grade aluminum or carbon fiber. Conductive elements may connect each band in a mesh to form the stator cage 136 on the exterior of the modules 120; 121. In some embodiments, pole shoes 142 may be aluminum spools fastened with pole caps (labeled "A", "B", "C", and "D") coupled to the stator cage elements 143 are isolated from stator cage 136 with mica tape. Copper or brass windings around pole shoes 142 may be connected in series-parallel on the horizontal plane or series-parallel on the vertical plane with adjacent pole shoes 142. In some embodiments, a central stator 136a may also be positioned in between the modules 120; 121. See FIGS. 17, 18, 20, and 22. The central stator 136a may comprise a core 144 which may be an elongated square tubing of aircraft grade aluminum or carbon fiber.

The stator 136 may function as am armature interacting with magnets 113; 114; 115; and 116 as the modules 120; 121 are induced to rotate. An electromagnetic field is produced by the magnets 113; 114; 115; 116 spinning in close proximity to the cage producing an alternating current output. Generally, permanent magnets 115; 116 may always interact with the stator(s) 136 during rotation of the modules 120; 121 producing a field flux. In some embodiments, the electromagnets 113; 114 will generally interact with the stator(s) 136 when the electromagnets 113; 114 are powered on. A terminal block (electrical output conductor) 137 may be attached to the stator 136 receiving the alternating current output which may be transferred to a rectifier 138 for conversion to direct current. A regulator 139 may be coupled to the rectifier 138 to maintain a constant voltage level. As will be appreciated, the combination of the modules 120; 121 with the stator 136 provides both a drive propulsion output from the modules 120; 121 driving the output drive shaft 110 and a power source from the AC output generated by the magnets 113; 114; 115; and 116 interacting with the proximate stator(s) 136.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

What is claimed is:

1. A magnetic propulsion drive system, comprising:
a first radial magnetic assembly (RMA);
a first axle coupled to the first RMA;
a first permanent magnet of a first polarity on an exterior surface of the first RMA;
a first electromagnet of a second polarity positioned next to the first permanent magnet on the first RMA;
a second RMA;
a second axle coupled to the second RMA;
a second electromagnet magnet of the first polarity on an exterior surface of the second RMA, the first permanent magnet disposed to align with the second electromagnet during rotation of the first RMA and rotation of the second RMA,
a second permanent magnet of the second polarity positioned next to second electromagnet on the second RMA, the first electromagnet dispose to align with the second permanent magnet during rotation of the first RMA and rotation of the second RMA,
wherein the second electromagnet is activated when in alignment with the first permanent magnet, the first electromagnet is activated when in alignment with the second permanent magnet, the first electromagnet and the second permanent magnet repelling from each other during activation of the first electromagnet, the second electromagnet and the first permanent magnet repelling from each other during activation of the second electromagnet and causing the first axle and second axle to rotate;
a drive shaft rotated by turning of the first axle and the second axle;
a stator element proximate the first permanent magnet and the second permanent magnet; and
an electrical output conductor coupled to the stator element configured to receive current generated by interaction of the first permanent magnet and the second permanent magnet with the stator element during rotation of the first RMA and rotation of the second RMA.

2. The magnetic propulsion drive system of claim 1, wherein activation of the second electromagnet includes providing current to the first electromagnet to provide a flux density of a same field as the first permanent magnet.

3. The magnetic propulsion drive system of claim 1, wherein alignment of the first electromagnet and the second permanent magnet comprises the second permanent facing the first electromagnet.

4. The magnetic propulsion drive system of claim 1, wherein:
the first RMA comprises at least two adjacently positioned rotor blocks, each rotor block including respectively a plurality of electromagnets of the same polarity and a plurality of permanent magnets of the same polarity, wherein electromagnets of the same type and same polarity on a first of the rotor blocks is adjacent and offset radially from electromagnets of the same type and same polarity on a second of the rotor blocks by an angle of 11.25 degrees from the axis of the first axle; and
the second RMA comprises at least two adjacently positioned rotor blocks, each rotor block including respectively a plurality of electromagnets of the same polarity and a plurality of permanent magnets of the same polarity, wherein electromagnets of the same type and same polarity on a first of the rotor blocks of the second RMA is adjacent and offset radially from electromagnets of the same type and same polarity on a second of the rotor blocks of the second RMA by an angle of 11.25 degrees from the axis of the first axle.

5. The magnetic propulsion drive module of claim of claim 4, wherein each electromagnet is spaced equidistant from any adjacent permanent magnet.

6. The magnetic propulsion drive module of claim of claim 1, wherein the stator element is a cage surrounding the first RMA and the second RMA.

7. The magnetic propulsion drive module of claim of claim 1, wherein the stator element is positioned in between the first RMA and the second RMA.

8. A magnetic propulsion drive module, comprising:
a first, a second, a third, and a fourth drive module arranged longitudinally parallel to each other, each drive module comprising at least one rotor block assembly including a plurality of electromagnets of a first polarity positioned to and configured to repel from a plurality of permanent magnets of the first polarity on any adjacent one of the first, second, third, or fourth drive modules,
the at least one rotor block assembly further including a plurality of electromagnets of a second polarity positioned in between electromagnets of the first polarity, the plurality of electromagnets of the second polarity positioned to and configured to repel from a plurality of permanent magnets of a second polarity on any adjacent one of the first, second, third, or fourth drive modules,
the repulsion of the electromagnets of the first polarity from the permanent magnets of the first polarity, and the repulsion of the electromagnets of the second polarity from the permanent magnets of the second polarity, causing radial momentum and rotation of the first, second, third, and fourth drive modules;
a gear coupled to the first, second, third, and fourth drive modules;
a drive shaft coupled to the output shaft gear and rotated by turning of the planetary gears coupled to either the first and third or second and fourth drive modules;
a stator element proximate the plurality of permanent magnets of the first polarity and the plurality of permanent magnets of the second polarity; and
an electrical output conductor coupled to the stator element configured to receive current generated by interaction of the plurality of permanent magnets of the first polarity and the plurality of permanent magnets of the second polarity with the stator element during rotation of the first, second, third, and fourth drive modules.

9. The magnetic propulsion drive module of claim 8, wherein the plurality of permanent magnets of the first polarity and the plurality of electromagnets of the first polarity have a north polarity, and the plurality of permanent magnets of the second polarity and the plurality of electromagnets of the second polarity have a south polarity.

10. The magnetic propulsion drive module of claim 8, further comprising a synchronization gear to align the at least one north polarity permanent magnet of one of the drive modules with the at least one north polarity electromagnet of an adjacent drive module.

11. The magnetic propulsion drive module of claim 8, wherein:

the at least one rotor block assembly includes two immediately adjacent and longitudinally positioned rotor block assemblies, and electromagnets of a same polarity are radially offset from one another on the same rotor assembly and are offset radially offset from one another between the two immediately adjacent and longitudinally positioned rotor block assemblies.

12. The magnetic propulsion drive module of claim of claim 8, wherein the stator element is a cage surrounding the first, second, third, and fourth drive modules.

13. The magnetic propulsion drive module of claim of claim 12, wherein the cage comprises bands of metallic strips disposed over the rotor blocks of the first, second, third, and fourth drive modules.

14. The magnetic propulsion drive module of claim of claim 8, wherein the stator element is positioned in between the first RMA and the second RMA.

* * * * *